United States Patent
Yang et al.

(10) Patent No.: US 12,294,922 B2
(45) Date of Patent: May 6, 2025

(54) ANNOUNCEMENT OF VEHICLE-TO-EVERYTHING CAPABILITIES

(71) Applicant: QUALCOMM Incorporated, San Diego, CA (US)

(72) Inventors: Seung Ryul Yang, San Diego, CA (US); Vincent Douglas Park, Alexandria, VA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/731,258

(22) Filed: Apr. 27, 2022

(65) Prior Publication Data

US 2023/0353992 A1    Nov. 2, 2023

(51) Int. Cl.
*G06F 15/16* (2006.01)
*H04W 4/40* (2018.01)
*H04W 80/12* (2009.01)

(52) U.S. Cl.
CPC .............. *H04W 4/40* (2018.02); *H04W 80/12* (2013.01)

(58) Field of Classification Search
CPC ................................ H04W 4/40; H04W 80/12
See application file for complete search history.

(56) References Cited

U.S. PATENT DOCUMENTS

| | | | |
|---|---|---|---|
| 2019/0110178 A1* | 4/2019 | Baghel | H04W 4/44 |
| 2020/0021451 A1* | 1/2020 | Pinheiro | H04W 4/40 |
| 2020/0296696 A1* | 9/2020 | Goldhamer | H04W 4/40 |
| 2021/0105789 A1* | 4/2021 | Freda | H04W 4/40 |
| 2022/0210601 A1* | 6/2022 | El Essaili | H04W 4/021 |
| 2022/0284818 A1* | 9/2022 | Kwak | G08G 1/22 |
| 2022/0343241 A1* | 10/2022 | Jha | G01C 21/3841 |
| 2022/0399927 A1 | 12/2022 | Tsai et al. | |
| 2023/0073658 A1* | 3/2023 | Fu | H04L 63/083 |
| 2023/0182848 A1 | 6/2023 | Hassan et al. | |

\* cited by examiner

*Primary Examiner* — Yves Dalencourt
(74) *Attorney, Agent, or Firm* — Loza & Loza LLP

(57) ABSTRACT

Aspects relate to sidelink transmissions directed towards vehicle-to-everything (V2X) applications. A UE may determine an application-layer capability of the UE in which the application-layer capability corresponds to a V2X application implemented on the UE, and transmit an announcement including an indication of the application-layer capability via a transceiver. A UE may also receive an announcement via a transceiver that includes an indication of an application-layer capability corresponding to a second UE in which the application-layer capability corresponds to a V2X application implemented on the second UE, and engage with the second UE via the V2X application.

22 Claims, 19 Drawing Sheets

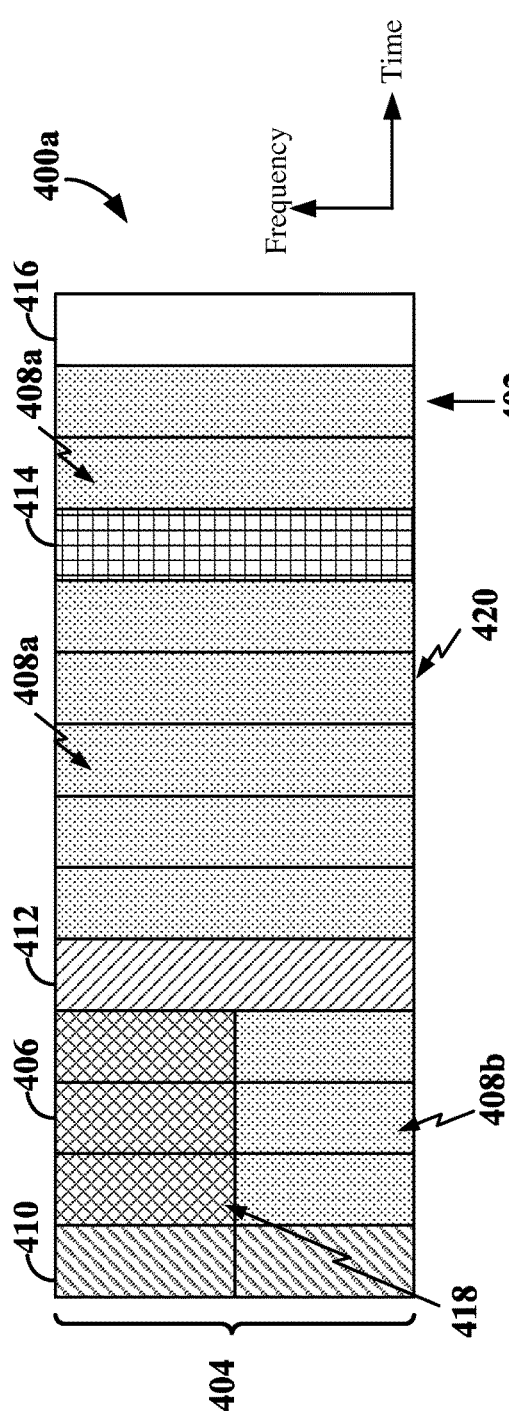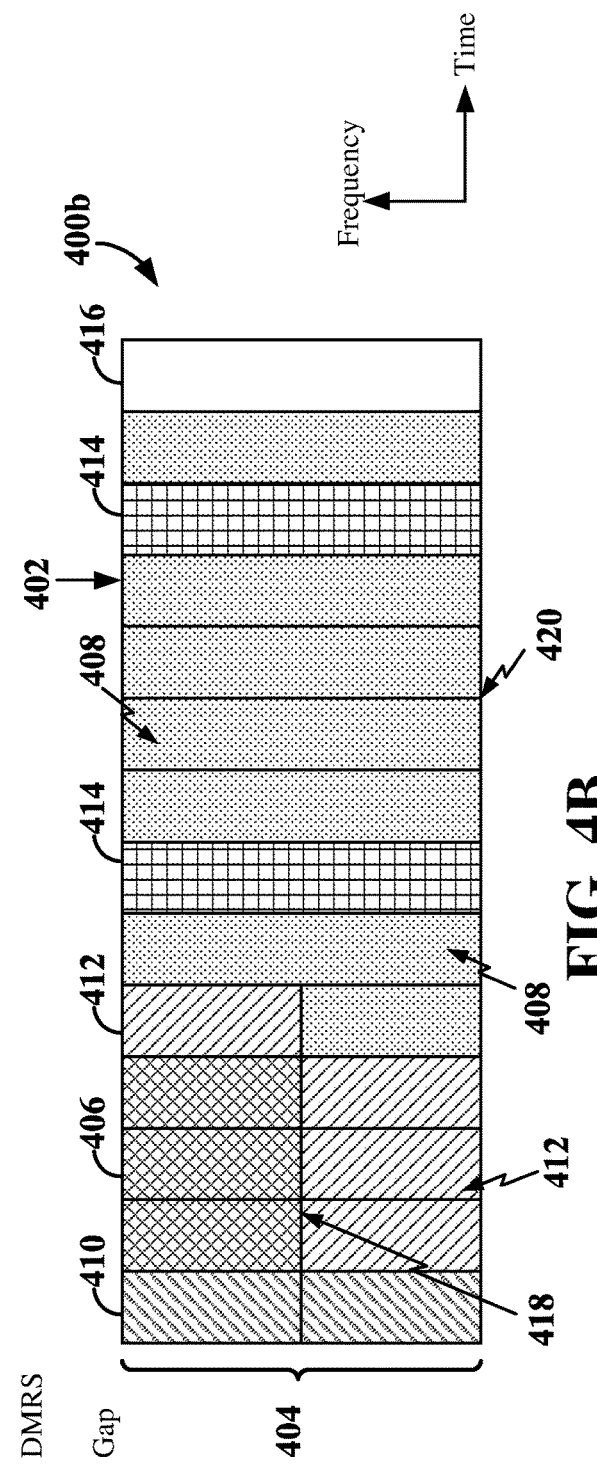

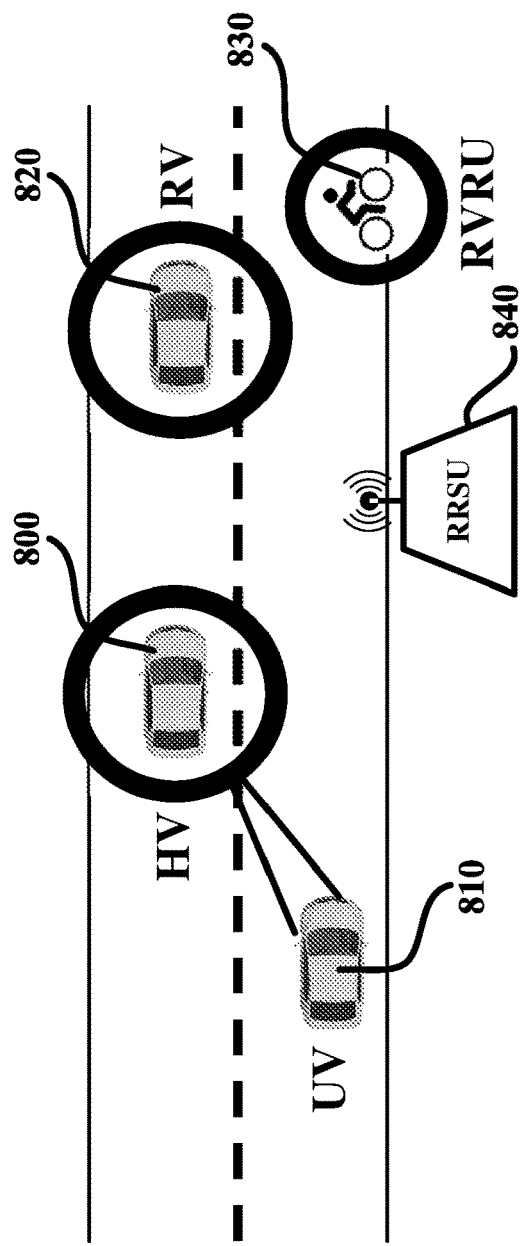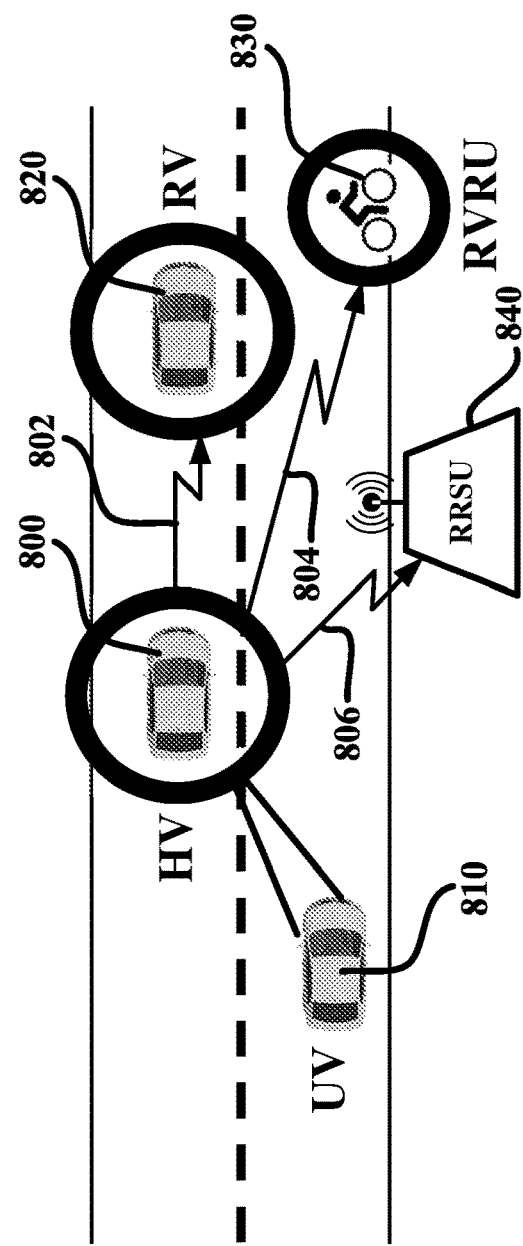
FIG. 8

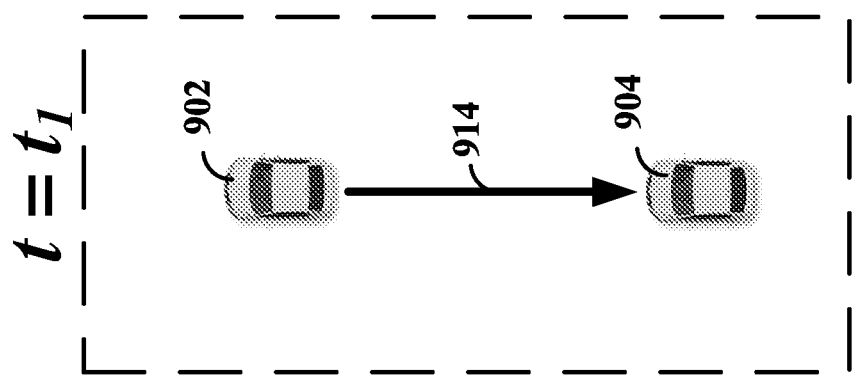
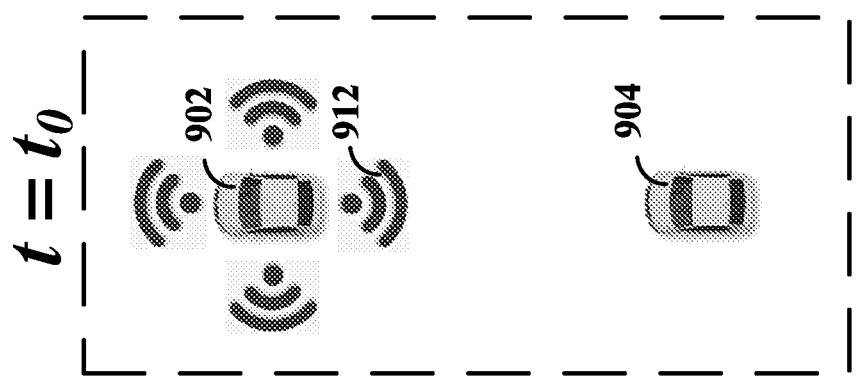
FIG. 9

```
BasicSafetyMessage ::= SEQUENCE {
  -- Part I, Sent at all times with each message
  coreData      BSMcoreData, -- Part II Content
  partII    SEQUENCE (SIZE(1..8)) OF
             PartIIcontent {{ BSMpartIIExtension }}   OPTIONAL,
  regional   SEQUENCE (SIZE(1..4)) OF
             RegionalExtension {{REGION.Reg-
             BasicSafetyMessage}} OPTIONAL,
  -- Part III Content
  activatedAppList    ActivatedAppList    OPTIONAL,
  ...
}
```

FIG. 14

ANNOUNCEMENT OF VEHICLE-TO-EVERYTHING CAPABILITIES

TECHNICAL FIELD

The technology discussed below relates generally to wireless communication networks, and more particularly, to disseminating application-layer Vehicle-to-Everything (V2X) capabilities via sidelink communications.

BACKGROUND

Vehicle-to-Everything (V2X) technologies are enabling vehicle-to-vehicle (V2V) and vehicle-to-infrastructure (V2I/I2V) communication for applications including Basic Safety, Automated Driving, Maneuver Coordination, Platooning, and Sensor Sharing. With respect to the Basic Safety application/service, it should be noted that vehicles can broadcast their identity, position and motion state to provide awareness to other vehicles and infrastructure. The Basic Safety application/service is currently a prerequisite to the more advanced applications such as Sensor Sharing and Maneuver Coordination. The protocols and messages for Basic Safety have been defined by ETSI (Cooperative Awareness Message, CAM), and by SAE and CSAE (Basic Safety Message, BSM), and those for advanced features are currently being defined by these SDOs.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) configured for wireless communication is disclosed. The UE includes a transceiver, a memory, and a processor coupled to the transceiver and the memory. The processor is configured to determine at least one application-layer capability of the UE in which the at least one application-layer capability corresponds to a vehicle-to-everything (V2X) application implemented on the UE, and further configured to transmit an announcement including an indication of the at least one application-layer capability via the transceiver.

Another example provides a method for wireless communication at a user equipment (UE). The method includes determining at least one application-layer capability of the UE in which the at least one application-layer capability corresponds to a vehicle-to-everything (V2X) application implemented on the UE, and transmitting an announcement including an indication of the at least one application-layer capability via the transceiver.

Another example provides a user equipment (UE) configured for wireless communication. The UE includes a transceiver, a memory, and a processor coupled to the transceiver and the memory. The processor is configured to receive an announcement via the transceiver that includes an indication of at least one application-layer capability corresponding to a second UE in which the at least one application-layer capability corresponds to a vehicle-to-everything (V2X) application implemented on the second UE, and further configured to engage with the second UE via the V2X application.

Another example provides a method for wireless communication at a user equipment (UE). The method includes receiving an announcement via the transceiver that includes an indication of at least one application-layer capability corresponding to a second UE in which the at least one application-layer capability corresponds to a vehicle-to-everything (V2X) application implemented on the second UE, and engaging with the second UE via the V2X application.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 4A and 4B are diagrams illustrating examples of sidelink slot structures according to some aspects.

FIG. 8 is a diagram illustrating an exemplary execution of a non-grouping application.

FIG. 9 is a diagram illustrating an exemplary execution of a non-grouping application according to some aspects.

FIG. 14 illustrates a first set of exemplary code according to some aspects.

DETAILED DESCRIPTION

Figure 1:
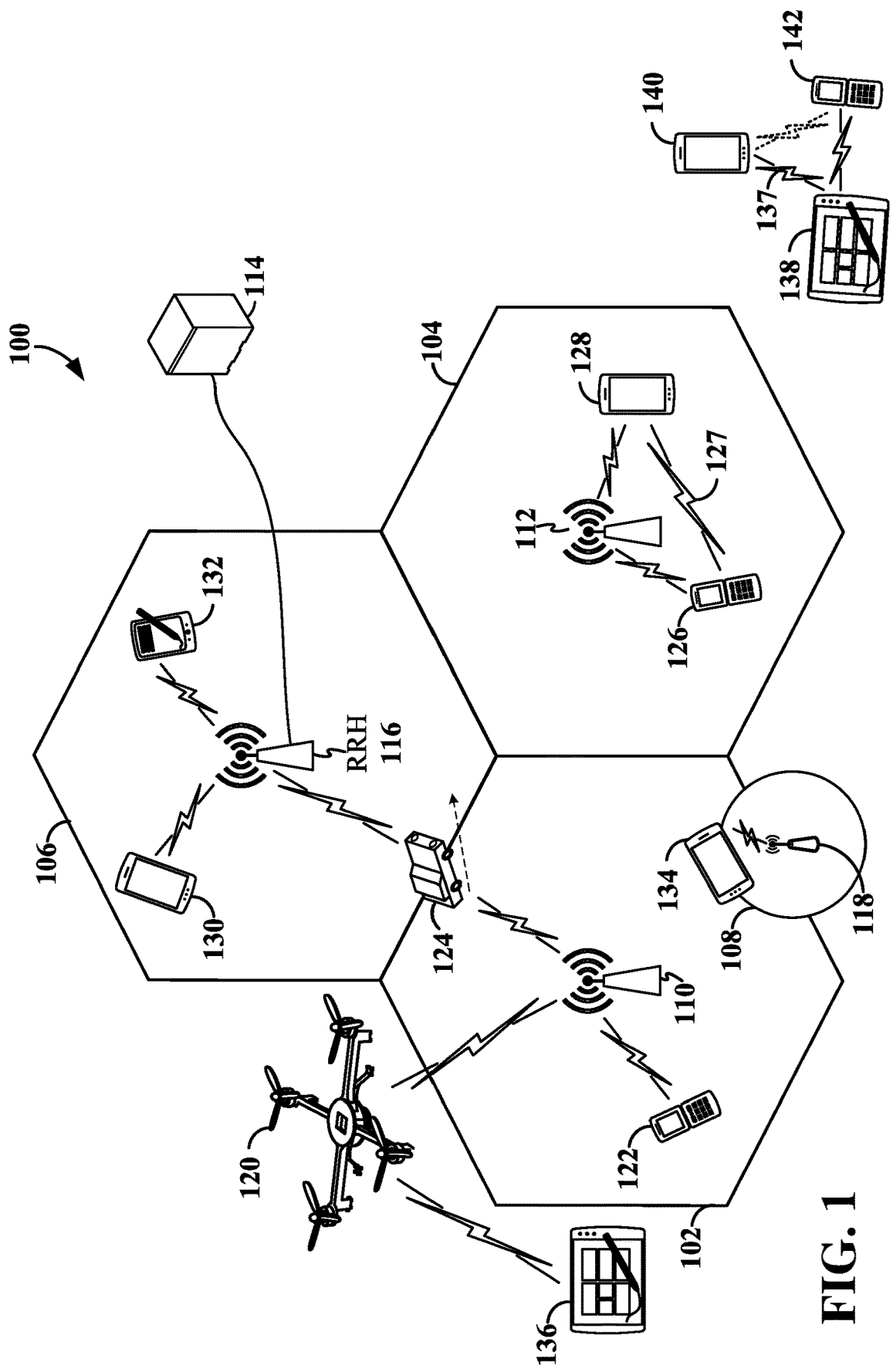
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to the announcement of (V2X) capabilities via sidelink communications. Here, it should be noted that many V2X vehicles that support Basic Safety do not support advanced features. Since some advanced features, such as Maneuver Coordination and Platooning, require that such features be supported by all the participants, it is desirable for an on-board unit (OBU) or RSU (i.e., a V2X entity) initiating an advanced feature to be aware of the capabilities of the target participants (i.e., that they support the feature). Furthermore, with respect to some advanced features (e.g., Sensor Sharing), it may be desirable for a V2X entity that provides the advanced feature to let other target users know its capability (e.g., not sending message vs. not supporting). This is particularly the case in an environment with different V2X entities supporting different features. Identifying a mechanism for V2X entities to signal their supported advanced features is thus desirable for successful deployment of these features.

In an aspect disclosed herein, V2X message information elements are identified that V2X entities can exchange as part of Basic Safety Messages to inform other V2X entities about (1) what advanced features they are supporting (i.e., activated), and (2) which of their supported advanced features are currently being invoked (i.e., running) Additionally, aspects disclosed herein include algorithms that (1) V2X entities can use to efficiently initiate advanced features with only V2X entities supporting those features, and (2) enable V2X entities to omit message transmission without implying that they are not supporting advanced features.

In a particular example, it is contemplated that application-layer capabilities are disseminated over a Basic Safety Message (BSM) or a Cooperative Awareness Message (CAM). The information exchange formats (information elements) may be standardized in application-layer related SDOs including SAE, ETSI, C-SAE/C-ITS. As a result, over the air (OTA) message exchanges can be readily detected.

It should be appreciated that the V2X applications disclosed herein are described using various terms, some of which are defined here for reference. For instance, as used herein, it should be noted that an "implemented application" is defined as an application that is implemented in the system of a V2X entity, whereas an "unimplemented application" is defined as an application that is not implemented in the system of a V2X entity. Furthermore, an "activated application" is defined as an implemented application that is activated by the system of a V2X entity, whereas a "deactivated application" is defined as an implemented application that is deactivated by the system of a V2X entity. Here, it should be further noted that an activated application is defined as "running" when corresponding application-specific conditions are met.

Aspects disclosed herein are also described with respect to "grouping applications" and "non-grouping applications". As used herein, a grouping application is defined as an application that needs to form a group in order to run. With such applications, a service initiator must form a group that includes the service initiator itself and service participants in order to run the application. Examples of grouping applications include, but are not limited to, Maneuver Sharing and Coordinating Service (SAE J3186), Platooning, and Cooperative Adaptive Cruise Control (CACC). Grouping applications include a service initiator and service participants, wherein the communications between them are usually session-oriented and bidirectional. It should also be noted that grouping applications usually run upon specific strategic needs or environmental conditions, wherein forming a group implicitly or explicitly is the first step of running the application (i.e., activated=waiting+forming a group (explicitly or implicitly)+running).

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station.

In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
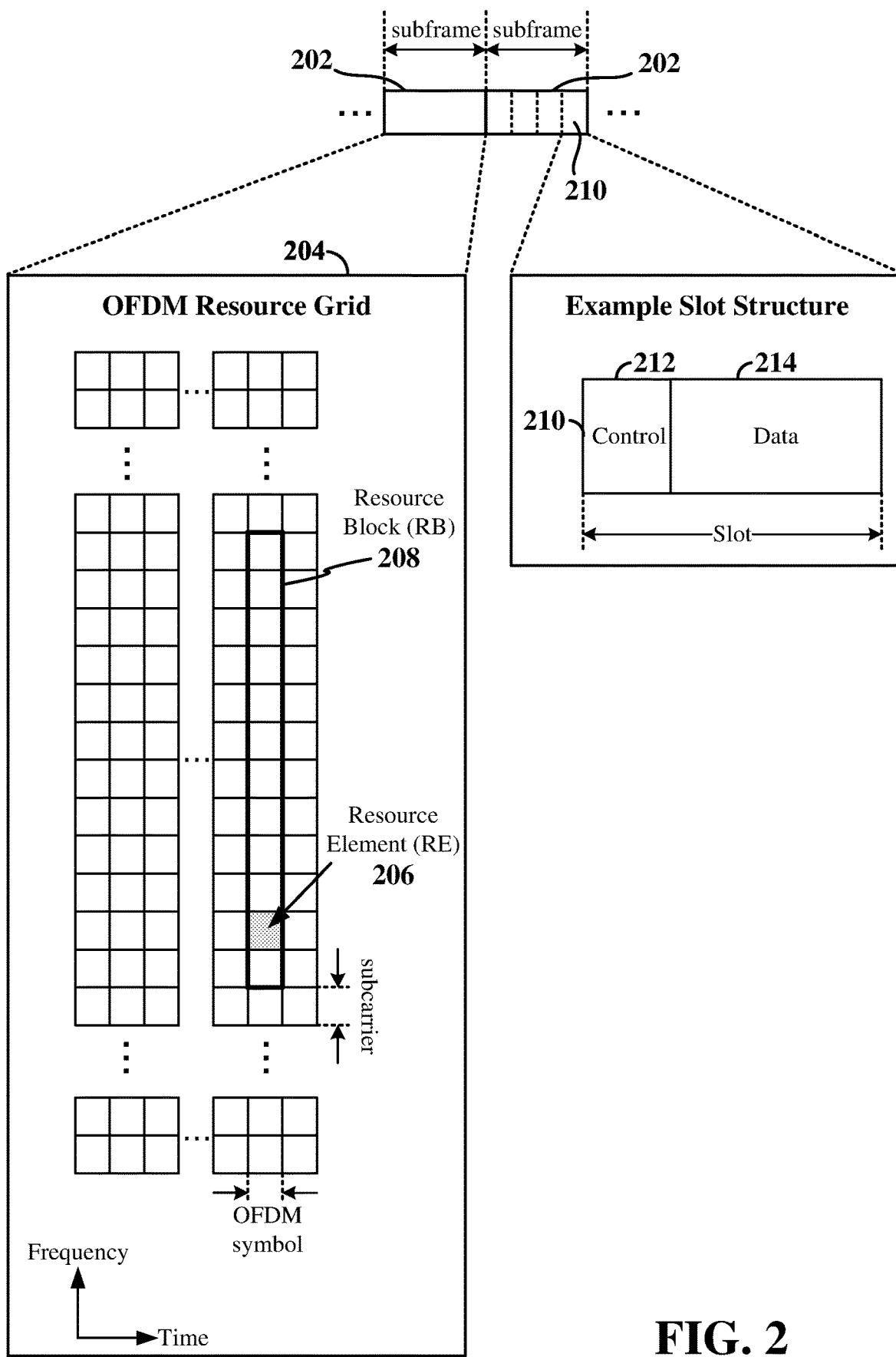
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time—frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE- SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DMRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
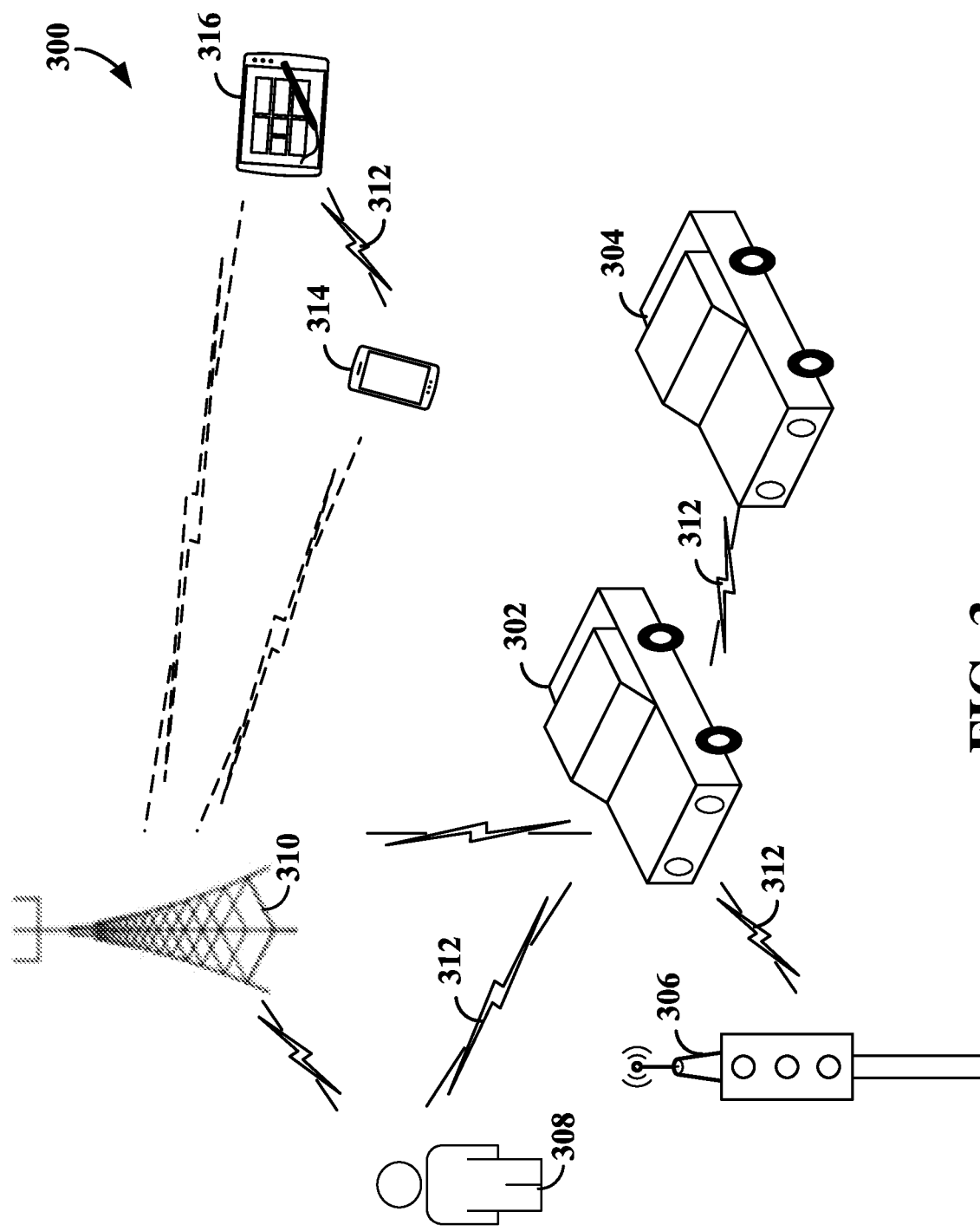
FIG. 3 is a diagram illustrating an example of a wireless communication network employing sidelink communication according to some aspects.

FIG. 3 illustrates an example of a wireless communication network 300 configured to support sidelink communication. In some examples, sidelink communication may include D2D or V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween.

In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel, which may include, for example, 10, 15, 20, 25, 50, 75, or 100 consecutive RBs, and the minimum resource allocation unit in time may be one slot. The number of sub-channels in a resource pool may include between one and twenty-seven. The configuration of the resource pool (RP) utilized between two sidelink devices for communication therebetween may be either pre-configured (e.g., a factory setting on the UE determined, for example, by sidelink standards or specifications) or provided by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of resources reserved for one or more retransmissions of the sidelink transmission (e.g., the sidelink traffic/data) or for one or more additional (new) sidelink transmissions. Thus, the SCI may include a respective PSSCH resource reservation and assignment for one or more PSSCH transmissions. For example, the SCI may include a reservation message indicating the PSSCH resource reservation for the initial sidelink transmission (initial PSSCH) and one or more additional PSSCH resource reservations for one or more retransmissions of the PSSCH.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 (e.g., SCI format 1-A) that schedules transmission of data traffic (e.g., a packet) on time—frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400a or 400b and the PSCCH 406 spans three symbols 402. The PSCCH 406 may further include DMRSs.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
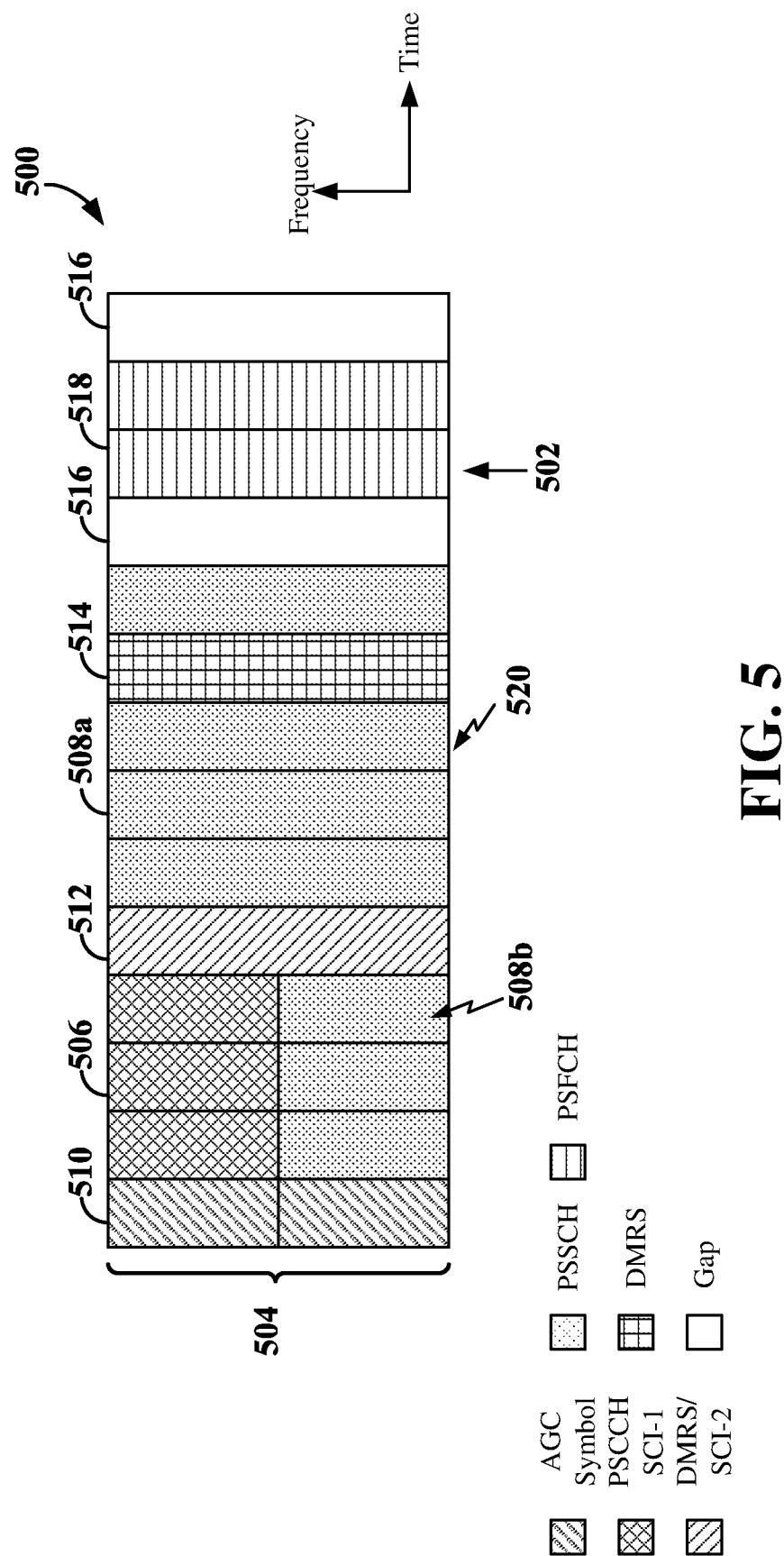
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500. The PSCCH 506 includes, for example, SCI-1 that schedules transmission of data traffic (e.g., a packet) on time—frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508b may be transmitted on both the first symbol and the second symbol.

For unicast and/or groupcast transmissions, HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

Figure 6:
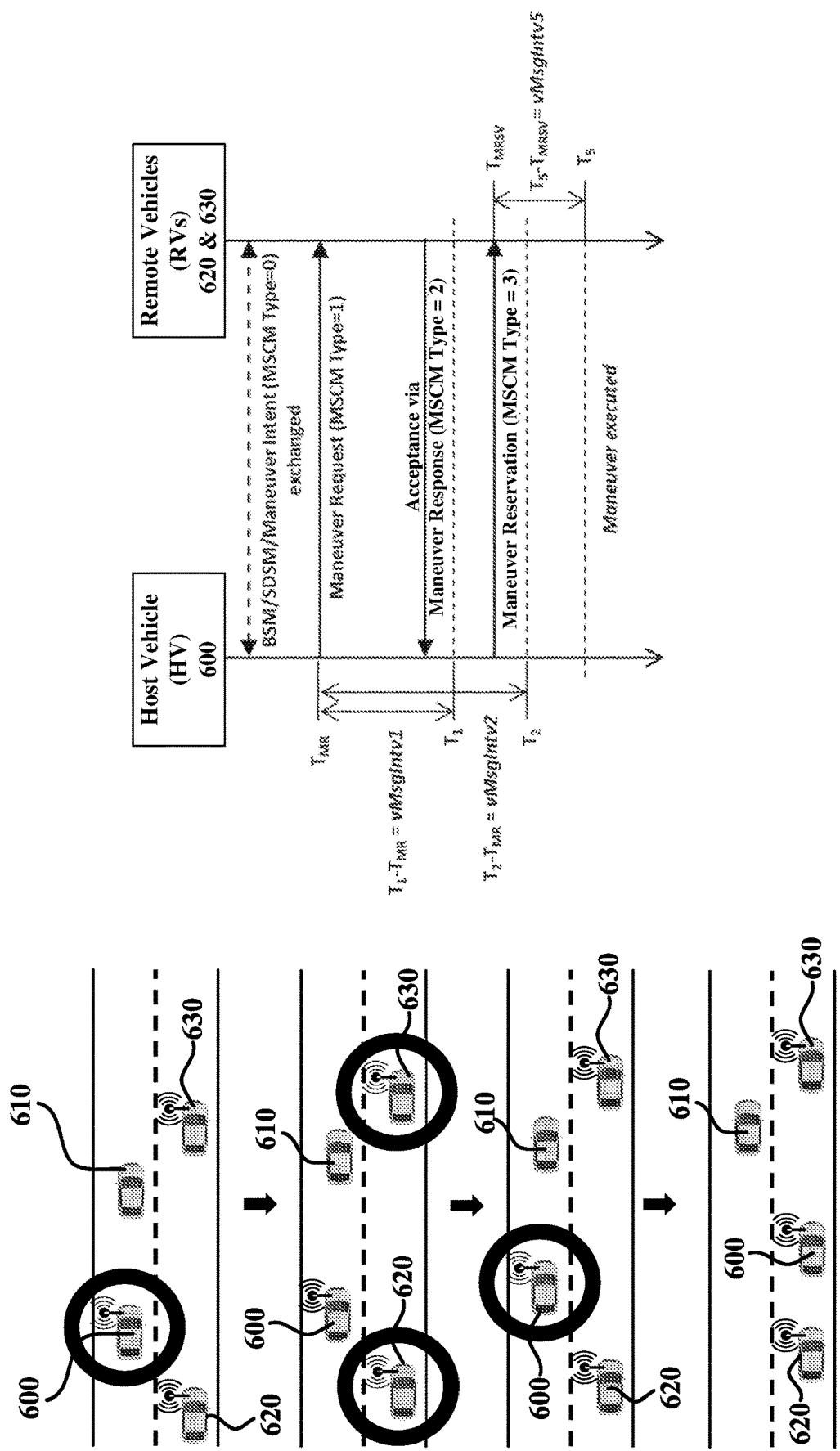
FIG. 6 is a diagram illustrating an exemplary execution of a grouping application.

Referring next to FIG. 6, an exemplary execution of a grouping application is provided in accordance with aspects disclosed herein. For this particular example, it is assumed that the grouping application is a Maneuver Sharing and Coordinating Service. As illustrated, a "maneuver intent" is optionally exchanged between host vehicle 600 and remote vehicles 620 and 630. Host vehicle 600 transmits a "maneuver request" communication for negotiating its intended maneuver to remote vehicles 620 and 630, which triggers the formation of a group to run the Maneuver Sharing and Coordinating Service. As shown, remote vehicles 620 and 630 then can accept the request via a "maneuver response" communication to host vehicle 600, which is then followed by a "maneuver reservation" communication from host vehicle 600 to remote vehicles 620 and 630. Host vehicle 600 can then execute the maneuver, as shown.

Figure 7:
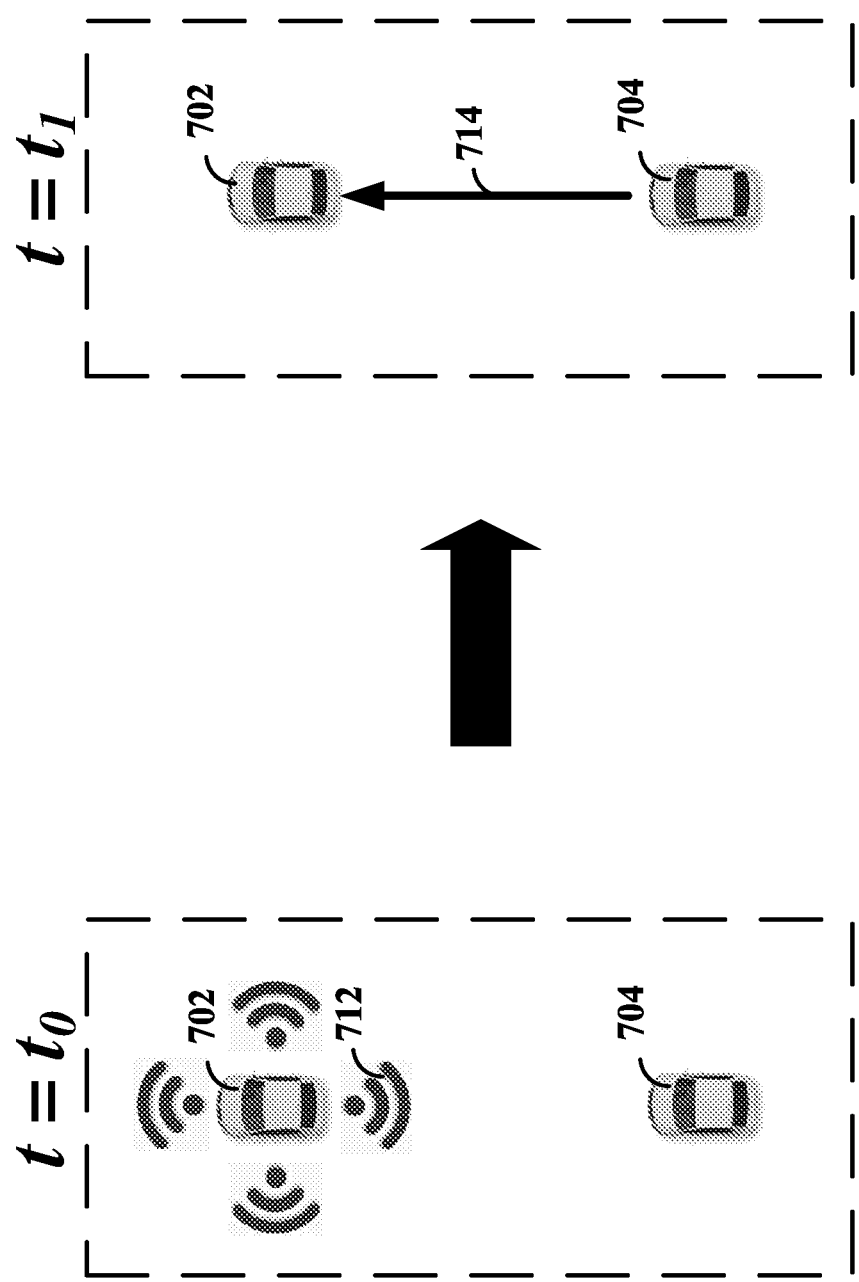
FIG. 7 is a diagram illustrating an exemplary execution of a grouping application according to some aspects.

An exemplary use case for group applications in accordance with aspects disclosed herein is now described with reference to FIG. 7. For this particular example, it can again be assumed that the desired grouping application is a Maneuver Sharing and Coordinating Service, wherein vehicle 702 begins as a potential service participant and vehicle 704 is a service initiator (i.e., desiring to form a group with service participants). Moreover, for a session-oriented protocol/application (i.e., a grouping application), it is noted that one V2X-entity (i.e., the service initiator) must initiate an attempt to establish a session with other V2X-entity(s) (i.e., the service participants). However, if the entity initiating the session has no prior knowledge as to whether another entity is even listening (i.e., activated), then needless unsuccessful session initiation messages may be sent. This can be particularly troublesome in a dynamic ad hoc vehicular network scenario where a significant fraction of the vehicles may not implement or activate the application. Thus, it would be desirable if active listening applications announce their existence (i.e., activated), and that such announcement be periodic, especially in a dynamic ad hoc network scenario. Using an existing periodic message (e.g., BSM or CAM) would be particularly desirable so as to preserve resources.

In this particular example, it is thus contemplated that vehicle 702 may be configured to disseminate its capability to run a Maneuver Sharing and Coordinating Service to vehicle 704 via sidelink communication 712, wherein sidelink communication 712 can deliver BSMs or CAMs. Once this announcement 712 is received by vehicle 704, vehicle 704 may then form a group with vehicle 702 and run the Maneuver Sharing and Coordinating Service by sending messages 714 with the knowledge that vehicle 702 is capable of running the Maneuver Sharing and Coordinating Service (i.e., the Maneuver Sharing and Coordinating Service is activated in vehicle 702). Moreover, vehicle 704 would not even attempt to form a group with a vehicle in which the Maneuver Sharing and Coordinating Service is not activated (i.e., where a potential service participant does not announce that Maneuver Sharing and Coordinating Service is activated).

With respect to non-grouping applications, such applications are defined as applications that do not need to form a group in order to run. Examples of non-grouping applications include, but are not limited to, Basic Safety applications based on BSM (SAE J3161/1, J2945/1) and Sensor Sharing (SAE J3224). Non-grouping applications include a service provider and service users, wherein the communication between them is usually session-less and unidirectional. It should also be noted that non-grouping applications usually do not have an application-specific running condition (i.e., activated=running).

Referring next to FIG. 8, an exemplary execution of a non-grouping application is provided in accordance with aspects disclosed herein. For this particular example, it is assumed that the non-grouping application is Sensor Sharing, wherein host vehicle 800 is the service provider and each of remote vehicle 820, cyclist 830, and infrastructure 840 are service users. As illustrated, host vehicle 800 senses/detects unidentified vehicle 810 at $t=t_0$. Then, at $t=t_1$, host vehicle 800 transmits an SDSM that includes the sensed/detected characteristics of unidentified vehicle 810 to each of remote vehicle 820, cyclist 830, and infrastructure 840, as shown.

An exemplary use case for non-group applications in accordance with aspects disclosed herein is now described with reference to FIG. 9. For this particular example, it can again be assumed that the desired non-group application is Sensor Sharing, wherein vehicle 902 is the service provider and vehicle 904 is the service user. Moreover, for a session-less protocol/application (i.e., non-grouping applications), it is noted that one V2X-entity (i.e., the service provider) broadcast V2X messages to other V2X-entity(s) (i.e., the service users) without establishing a session. However, when the service provider temporarily stops broadcasting due to an application-specific reason, if the service users have no prior knowledge as to whether the service provider is running the application, then the service user cannot know if it is because the service provider is not running the application; the service provider is not nearby; or there is a (e.g., application-specific) reason for not sending a message for the application. This can be misleading in a dynamic ad hoc vehicular network scenario where a significant fraction of the vehicles may not implement or activate the application and where there can be an application-specific message triggering condition. (e.g., where the Sensor Sharing service provider is periodically broadcasting messages containing information of detected non-V2X objects but pauses it when no object is detected). Thus, it would be desirable if active providing applications announce their existence (i.e., activated), and that such announcement be periodic, especially in a dynamic ad hoc network scenario. Using an existing periodic message (e.g., BSM or CAM) would be particularly desirable so as to preserve resources.

In this particular example, it is thus contemplated that vehicle 902 may be configured to disseminate its capability to run Sensor Sharing to vehicle 904 via sidelink communication 912, wherein sidelink communication 912 can deliver BSMs or CAMs. Thereafter, vehicle 904 can begin receiving Sensor Sharing messages 922 from vehicle 902, and when no Sensor Sharing message is received from vehicle 902, vehicle 904 can know that it is because vehicle 902 either is not running Sensor Sharing or because there is a (e.g., application-specific) reason of not sending a Sensor Sharing message.

It should be noted that transmitting an announcement of V2X capabilities via BSM or CAM as disclosed herein has several advantages over alternative methods. For instance, with respect to the announcement of activated grouping applications, it is noted that such announcement might be done via existing service advertisement protocols, or a new dedicated V2X message. However, existing service advertisement protocols (e.g., IEEE 1609.3 WSA (WAVE Service Advertisement), or ETSI-ITS SA (Service Announcement)) provide the current service availability (i.e., running applications/services) of a service provider. Therefore, it is not generally applicable to announce activated applications (which may not be currently running but waiting), and is not applicable to be announced by potential service participants (not a service provider waiting/listening). A new dedicated V2X messages can be used as well, but it will be inefficient in terms of radio frequency resource because the data size of actual information is relatively small compared with usual V2X messages, but it needs similar size of data overhead to be formulated as a V2X message. Expanding the existing service advertisement protocols to allow them to be sent by the potential service participants will be similarly inefficient to using a new dedicated V2X message because the existing service advertisement protocols are optional and currently used for specific purposes only.

With respect to the announcement of activated non-grouping applications, it is noted that such announcement might also be done via existing service advertisement protocols, or a new dedicated V2X message. Here, although new dedicated V2X messages can be used, it will also be inefficient in terms of radio frequency resource because the data size of actual information is relatively small to usual V2X messages, but it needs similar size of data overhead to be formulated as a V2X message. Also, although using existing service advertisement protocols is applicable for these types of applications, they will be similarly inefficient to using a new dedicated V2X message because the existing service advertisement protocols are optional and currently used for specific purposes only.

As disclosed herein, it is contemplated that the announcement of activated applications (both grouping and non-grouping) can be desirably added to existing Basic Safety V2X messages (e.g., BSM for US, CAM for EU). This is applicable to announce activated grouping applications (which may not be running) unlike existing service advertisement protocols which provide the current service availability (i.e., running applications/services). This is also applicable to a potential service participant because the Basic Safety V2X messages are sent by all V2X entities, unlike existing service advertisement protocols which are only allowed to service providers. This methodology is also efficient in terms of radio frequency resource because this can be added to existing messages instead of being formulated into new dedicated V2X messages. With respect to application behavior, it should also be noted that V2X entities (service initiators) of a grouping application can use this methodology to efficiently initiate the application with only V2X entities activating the application, and that V2X entities (service providers) of a non-grouping application can omit message transmission for an application without misleading that they are not activating the application.

Figure 10:
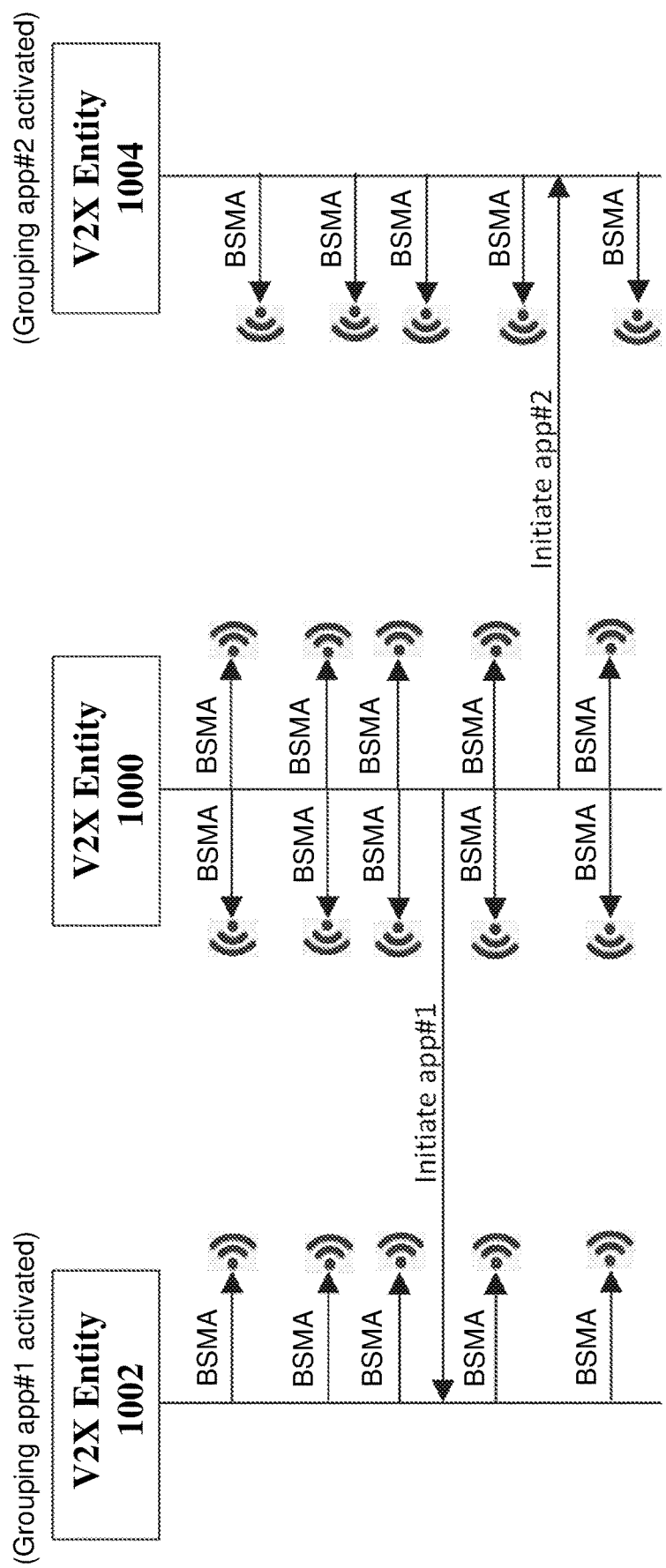
FIG. 10 is a diagram illustrating exemplary advantages of according to some aspects with respect to grouping applications.
Figure 11:
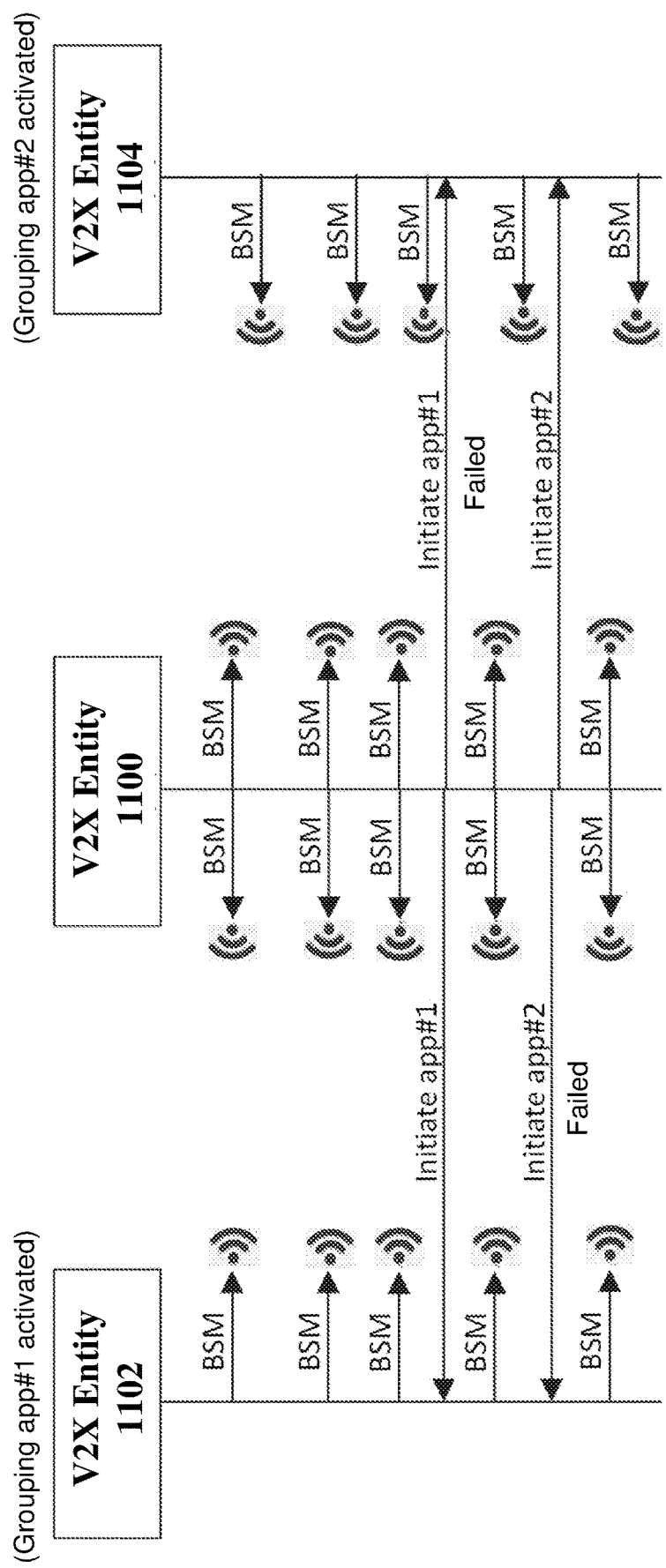
FIG. 11 is a diagram illustrating a first comparison of the advantages illustrated in FIG. 10 according to some aspects.
Figure 12:
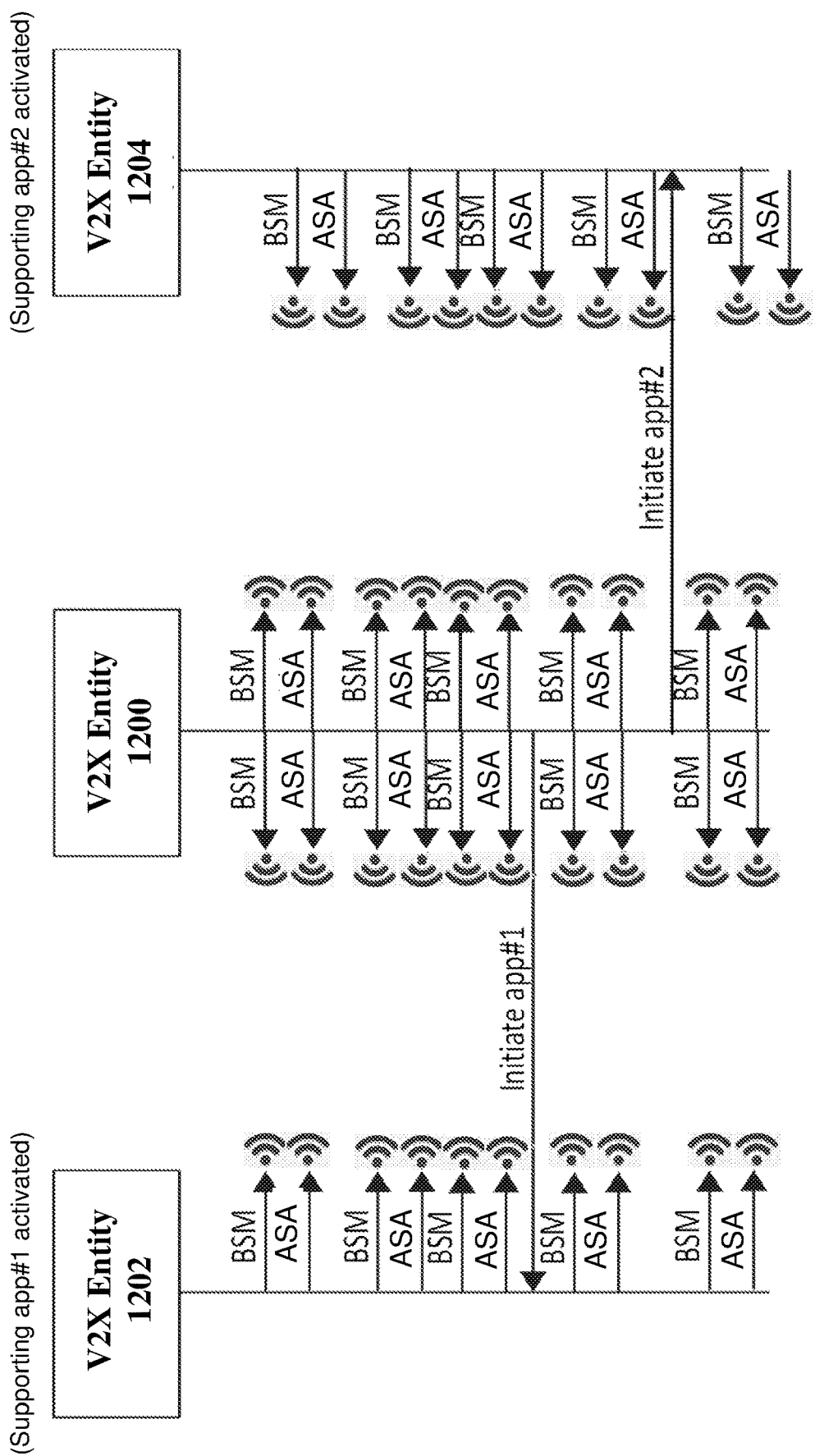
FIG. 12 is a diagram illustrating a second comparison of the advantages illustrated in FIG. 10 according to some aspects.

Referring next to FIGS. 10-12, graphical illustrations are provided to demonstrate exemplary advantages of announcing V2X capabilities of grouping applications via existing Basic Safety V2X messages (e.g., BSM for US, CAM for EU). In FIG. 10, for example, a BSM announcement (BSMA) methodology is contemplated in accordance with aspects disclosed herein. Here, it is assumed that a first grouping application is activated on V2X entity 1002, and a second grouping application is activated on V2X entity 1004, wherein the second grouping application is not activated on V2X entity 1002, and wherein the first grouping application is not activated on V2X entity 1004. For this particular example, V2X entity 1000 receives a first BSMA from V2X entity 1002 notifying it that a first grouping application is activated on V2X entity 1002, and a second BSMA from V2X entity 1004 notifying it that a second grouping application is activated on V2X entity 1004. As shown, because V2X entity 1000 knows that these grouping applications are respectively activated on V2X entity 1002 and V2X entity 1004, V2X entity 1000 can respectively initiate each application. Moreover, V2X entity 1000 can form a first group with V2X entity 1002 and run the first group application by sending messages for the first group application to V2X entity 1002, and form a second group with V2X entity 1004 and run the second group application by sending messages for the second group application to V2X entity 1004.

In FIG. 11, a similar scenario is illustrated where no announcement of activated grouping applications is made by potential service participants (e.g., where the service initiator, V2X entity 1100, just relies on existing service advertisement protocols). Here, it is assumed that a first grouping application is activated on V2X entity 1102, and a second grouping application is activated on V2X entity 1104, wherein the second grouping application is not activated on V2X entity 1102, and wherein the first grouping application is not activated on V2X entity 1104. In this example, attempts by V2X entity 1100 to initiate a grouping application can fail since it does not know beforehand whether the desired grouping application is activated on the corresponding V2X entity. For instance, as shown, an attempt to initiate the first grouping application on V2X entity 1104 fails, and an attempt to initiate the second grouping application on V2X entity 1102 fails.

In FIG. 12, a similar scenario is illustrated where an announcement of supporting applications is sent via dedicated V2X messages, e.g., ASA (Announcement of supporting applications) messages (equally expanding existing service advertisement protocols). Here, it is assumed that a first grouping application is activated on V2X entity 1202, and a second grouping application is activated on V2X entity 1204, wherein the second grouping application is not activated on V2X entity 1202, and wherein the first grouping application is not activated on V2X entity 1204. In this example, although new dedicated V2X messages can be used, such method is inefficient in terms of radio frequency resources, as shown (i.e., since additional resources need to be allocated to transmit the ASA, rather than embedding the announcement within an existing BSM).

Figure 13:
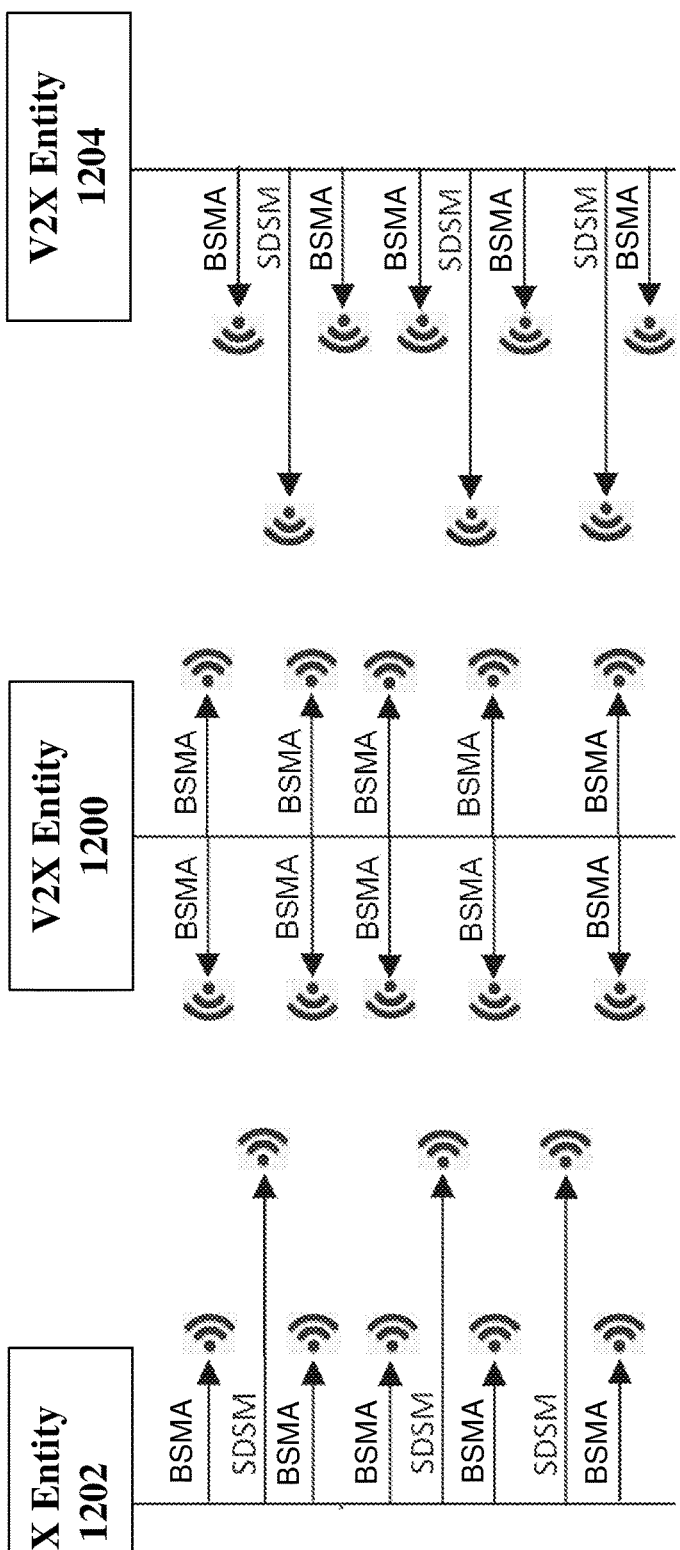
FIG. 13 is a diagram illustrating exemplary advantages of according to some aspects with respect to non-grouping applications.

Referring next to FIG. 13, a graphical illustration is provided to demonstrate exemplary advantages of announcing V2X capabilities of non-grouping applications via existing Basic Safety V2X messages (e.g., BSM for US, CAM for EU). Here, it is assumed that a first non-grouping application is activated on V2X entity 1302, and a second non-grouping application is activated on V2X entity 1304, wherein the second non-grouping application is not activated on V2X entity 1302, and wherein the first non-grouping application is not activated on V2X entity 1304. For this particular example, V2X entity 1300 receives a first BSMA from V2X entity 1302 notifying it that a first non-grouping application is activated on V2X 1302, and a second BSMA from V2X entity 1304 notifying it that a second non-grouping application is activated on V2X 1304. As shown, because V2X entity 1300 knows that these non-grouping applications are respectively activated on V2X entity 1302 and V2X entity 1304, V2X entity 1300 knows that, if it does not receive an SDSM, it does not necessarily mean that either of those non-grouping applications are not activated. Moreover, V2X entity 1302 and V2X entity 1304 can be configured to omit message transmissions for an application without misleading that they are not activating the application. By way of example, with respect to Sensor Sharing, it should be noted that although an SDSM can alternatively be sent indicating that no objects have been sensed/detected, such method undesirably wastes resources.

Figure 15:
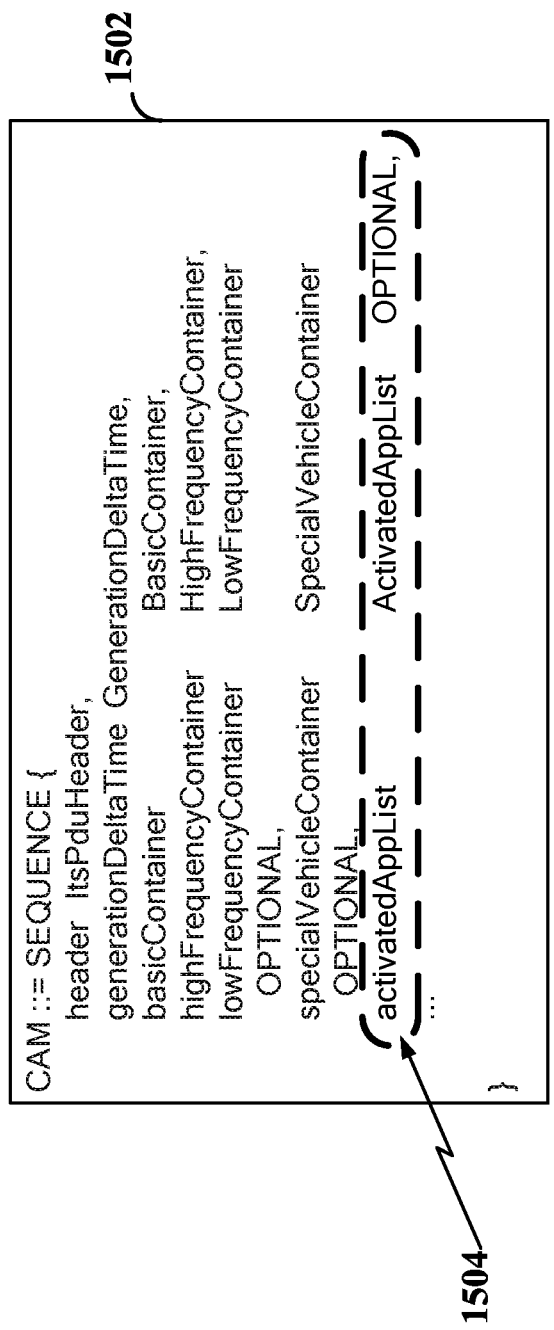
FIG. 15 illustrates a second set of exemplary code according to some aspects.
Figure 16:
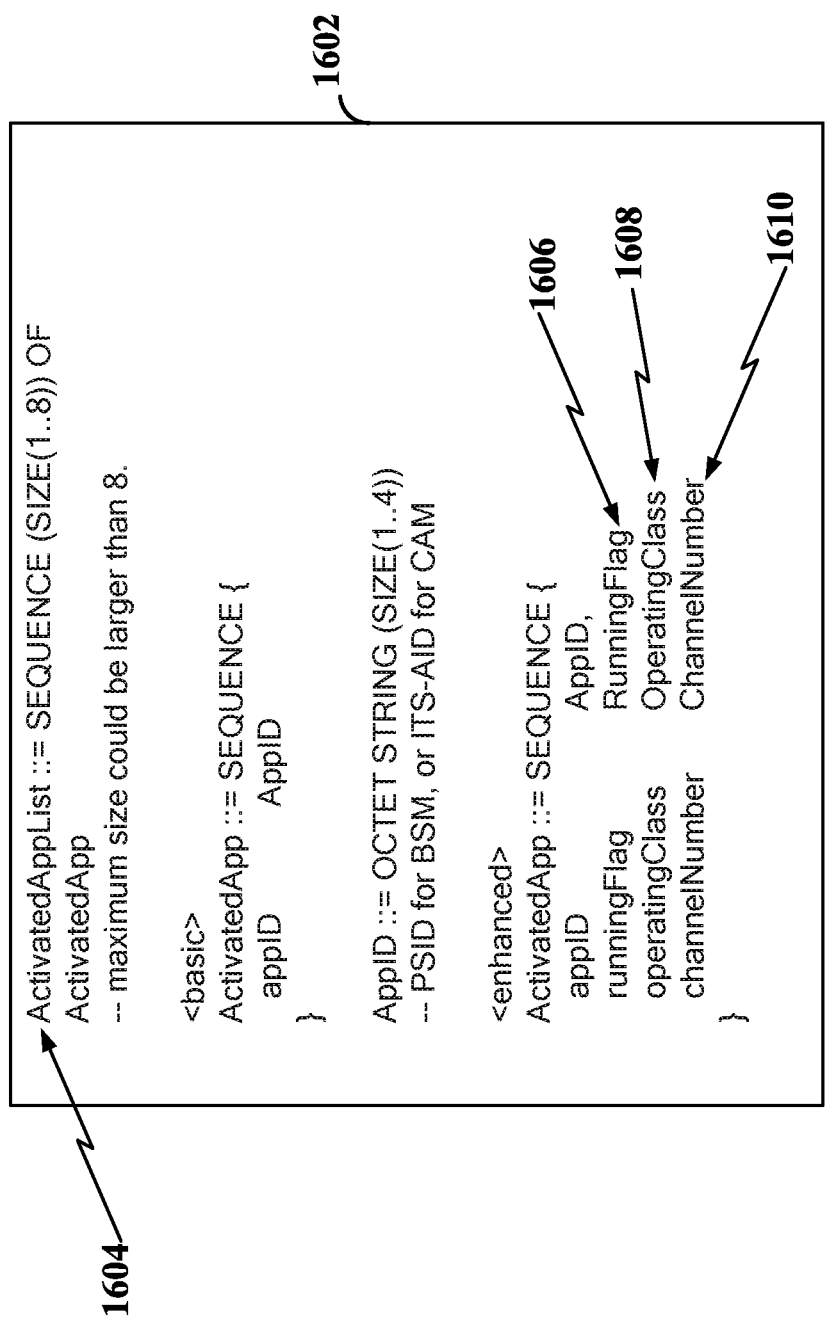
FIG. 16 illustrates a third set of exemplary code according to some aspects.

Referring next to FIGS. 14-16, diagrams illustrating exemplary configurations of the aspects disclosed herein are provided. For instance, FIG. 14 illustrates a configuration 1402 in which code 1404 is added to a current message format for BSM to support the aspects disclosed herein. For this configuration 1402, it should be noted that an "activatedAppList" field can be put in a different place of BSM (e.g., in "coreData", "partII" etc.). FIG. 15 illustrates a configuration 1502 in which code 1504 is added to a current message format for CAM to support the aspects disclosed herein. For this configuration 1502, it should be noted that an "activatedAppList" field can be put in a different place of CAM (e.g., in "basicContainer", "highFrequencyContainer", "lowFrequencyContainer", etc.).

FIG. 16 illustrates a configuration 1602 of an exemplary message format to support the aspects disclosed herein. It should be noted that "ActivatedAppList" format for the "activatedAppList" field in code 1604 may correspond to sequence of one or more "ActivatedApp" format where each "ActivatedApp" format contains the identifier of an activated application ("appID") and the identifier can be set to a value of PSID (Provider Service Identifier) for BSM or ITS-AID (Intelligent Transportation Systems Application Identifier) for CAM. Here, it should be noted that code 1606 may correspond to a BOOLEAN, wherein a "true" value may indicate that the application is running, and wherein a "false" value may indicate that the application is not running. Code 1606 may also correspond to information that could be beneficial for application-specific behavior (e.g., a possible application-specific rule to not form a group with a V2X entity which is already running the application). Meanwhile, each of code 1608 and code 1610 may correspond to an OCTET STRING (SIZE(1)) (e.g., as specified in IEEE Std 802.11), wherein code 1610 may be desirable when an announced application is available in a different channel and the channel cannot be known by the appID, for example.

Figure 17:
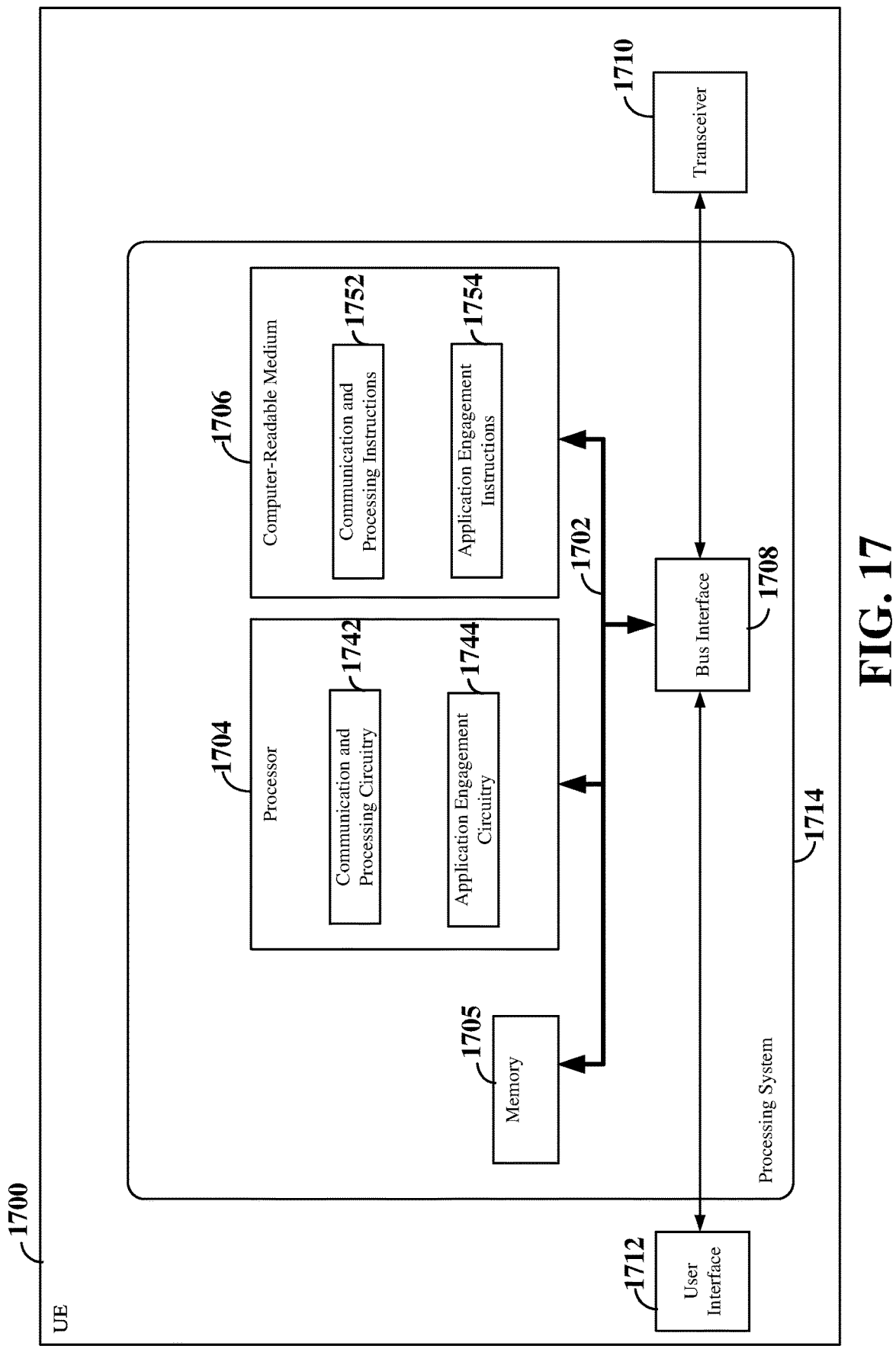
FIG. 17 is a block diagram illustrating an example of a hardware implementation for a UE employing a processing system according to some aspects.

With respect to code 1604, it should be appreciated that "ActivatedAppList" format for the "activatedAppList" field can be a space-efficient probabilistic data structure instead of directly listing PSID (or ITS-AID) so that the data size of the field cannot be increased proportionally to the number of listed applications. For example, a "Bloom filter" can be used for the field so that the field can be set to m bits array for n applications with a specific false positive probability limit. Within such an example, it should be appreciated that an empty Bloom filter may be a bit array of m bits, all set to 0. There must also be k different hash functions defined, each of which maps or hashes some set element to one of the m array positions, generating a uniform random distribution. Typically, k is a small constant which depends on the desired false error rate ε, while m is proportional to k and the number of elements to be added. To add an element (i.e., a PSID/ITS-AID), it can be fed to each of the k hash functions to get k array positions, wherein the bits at all these positions can be set to 1. To query for an element (i.e., test whether it is in the set), it can be fed to each of the k hash functions to get k array positions. If any of the bits at these positions is 0, the element is definitely not in the set; if it were, then all the bits would have been set to 1 when it was inserted. If all are 1, then either the element is in the set, or the bits have by chance been set to 1 during the insertion of other elements, resulting in a false positive. In a simple Bloom filter, there is no way to distinguish between the two cases, but more advanced techniques can address this problem FIG. 17 is a block diagram illustrating an example of a hardware implementation for a UE 1700 employing a processing system 1714. For example, the UE 1700 may correspond to a sidelink device, such as a V2X device, D2D device or other UE or wireless communication device configured for sidelink communication, as shown and described above in reference to the FIGs. enclosed herein.

The UE 1700 may be implemented with a processing system 1714 that includes one or more processors 1704. Examples of processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1700 may be configured to perform any one or more of the functions described herein. That is, the processor 1704, as utilized in the UE 1700, may be used to implement any one or more of the processes and procedures described below.

The processor 1704 may in some instances be implemented via a baseband or modem chip and in other implementations, the processor 1704 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1714 may be implemented with a bus architecture, represented generally by the bus 1702. The bus 1702 may include any number of interconnecting buses and bridges depending on the specific application of the processing system 1714 and the overall design constraints. The bus 1702 links together various circuits including one or more processors (represented generally by the processor 1704), a memory 1705, and computer-readable media (represented generally by the computer-readable medium 1706). The bus 1702 may also link various other circuits such as timing sources, peripherals, voltage regulators, and power management circuits, which are well known in the art, and therefore, will not be described any further.

A bus interface 1708 provides an interface between the bus 1702 and a transceiver 1710. The transceiver 1710 provides a communication interface or a means for communicating with various other apparatus over a transmission medium (e.g., air interface). Depending upon the nature of the apparatus, a user interface 1712 (e.g., keypad, display, touch screen, speaker, microphone, control knobs, etc.) may also be provided. Of course, such a user interface 1712 is optional, and may be omitted in some examples.

The processor 1704 is responsible for managing the bus 1702 and general processing, including the execution of software stored on the computer-readable medium 1706. The software, when executed by the processor 1704, causes the processing system 1714 to perform the various functions described below for any particular apparatus. The computer-readable medium 1706 and the memory 1705 may also be used for storing data that is manipulated by the processor 1704 when executing software.

One or more processors 1704 in the processing system may execute software (e.g., via communication and processing instructions 1752, which facilitate performing functions similar to functions provided by communication and processing circuitry 1742, and application engagement instructions 1754, which facilitate performing functions similar to functions provided by application engagement circuitry 1752). Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1706.

The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may reside in the processing system 1714, external to the processing system 1714, or distributed across multiple entities including the processing system 1714. The computer-readable medium 1706 may be embodied in a computer program product. By way of example, a computer program product may include a computer-readable medium in packaging materials. In some examples, the computer-readable medium 1706 may be part of the memory 1705. Those skilled in the art will recognize how best to implement the described functionality presented throughout this disclosure depending on the particular application and the overall design constraints imposed on the overall system. In some examples, the computer-readable medium 1706 may be implemented on an article of manufacture, which may further include one or more other elements or circuits, such as the processor 1704 and/or memory 1705.

In some aspects of the disclosure, the processor 1704 may include circuitry configured for various functions. For example, the processor 1704 may include communication and processing circuitry 1742, configured to communicate with one or more sidelink devices (e.g., other wireless communication devices) via respective sidelinks (e.g., PC5 interfaces). In addition, the communication and processing circuitry 1742 may be configured to communicate with a network entity (e.g., a base station, such as a gNB or eNB) via a Uu link. In some examples, the communication and processing circuitry 1742 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1742 may include one or more transmit/receive chains.

In some implementations where the communication involves receiving information, the communication and processing circuitry 1742 may obtain information from a component of the UE 1700 (e.g., from the transceiver 1710 that receives the information via radio frequency signaling or some other type of signaling suitable for the applicable communication medium), process (e.g., decode) the information, and output the processed information. For example, the communication and processing circuitry 1742 may output the information to another component of the processor 1704, to the memory 1705, or to the bus interface 1708. In some examples, the communication and processing circuitry 1742 may receive one or more of signals, messages, other information, or any combination thereof. In some examples, the communication and processing circuitry 1742 may receive information via one or more channels. In some examples, the communication and processing circuitry 1742 may include functionality for a means for receiving. In some examples, the communication and processing circuitry 1742 may include functionality for a means for processing, including a means for demodulating, a means for decoding, etc.

In some implementations where the communication involves sending (e.g., transmitting) information, the communication and processing circuitry 1742 may obtain information (e.g., from another component of the processor 1704, the memory 1705, or the bus interface 1708), process (e.g., modulate, encode, etc.) the information, and output the processed information. For example, the communication and processing circuitry 1742 may output the information to the transceiver 1710 (e.g., that transmits the information via radio frequency signaling or some other type of signaling suitable for the applicable communication medium). In some examples, the communication and processing circuitry 1742 may send one or more of signals, messages, other information, or any combination thereof. In some examples, the communication and processing circuitry 1742 may send information via one or more channels. In some examples, the communication and processing circuitry 1742 may include functionality for a means for sending (e.g., a means for transmitting). In some examples, the communication and processing circuitry 1742 may include functionality for a means for generating, including a means for modulating, a means for encoding, etc.

In some examples, the communication and processing circuitry 1742 may be configured to transmit an announcement including an indication of the at least one application-layer capability via the transceiver 1710. In another example, the communication and processing circuitry 1742 may be configured to receive an announcement via the transceiver 1710 that includes an indication of at least one application-layer capability corresponding to a second UE in which the at least one application-layer capability corresponds to a V2X application implemented on the second UE.

The processor 1704 may further include application engagement circuitry 1744. In some examples, the application engagement circuitry 1744 may be configured to determine at least one application-layer capability of the UE, wherein the at least one application-layer capability corresponds to a V2X application implemented on the UE. In another example, the application engagement circuitry 1744 may be configured to engage with a second UE via the V2X application.

With respect to transmitting an announcement of V2X capability in accordance with aspects disclosed herein, various examples are contemplated. For instance, in some examples, UE 1700 is further configured to embed an announcement including an indication of at least one application-layer capability within one of a Basic Safety Message (BSM) or a Cooperative Awareness Message (CAM). In some examples, the V2X application is a grouping application, wherein UE 1700 is further configured to receive a communication specific to the V2X application in response to transmitting the announcement that includes an indication of at least one application-layer capability, and/or wherein UE 1700 is further configured to join a group associated with V2X application. In some examples, the V2X application is a non-grouping application, wherein UE 1700 is further configured to refrain from transmitting a message corresponding to the V2X application unless an application-specific trigger is detected (e.g., where the V2X application is a Sensor Sharing application).

With respect to receiving an announcement of V2X capability in accordance with aspects disclosed herein, various examples are contemplated. For instance, in some examples, UE 1700 is further configured to receive an announcement including an indication of at least one application-layer capability within one of a Basic Safety Message (BSM) or a Cooperative Awareness Message (CAM). In some examples, the V2X application is a grouping application, wherein UE 1700 is further configured to transmit a communication specific to the V2X application in response to receiving the announcement that includes an indication of at least one application-layer capability, and/or wherein UE 1700 is further configured to join a group associated with V2X application. In some examples, the V2X application is a non-grouping application, wherein the V2X application is a Sensor Sharing application, for example.

Figure 18:
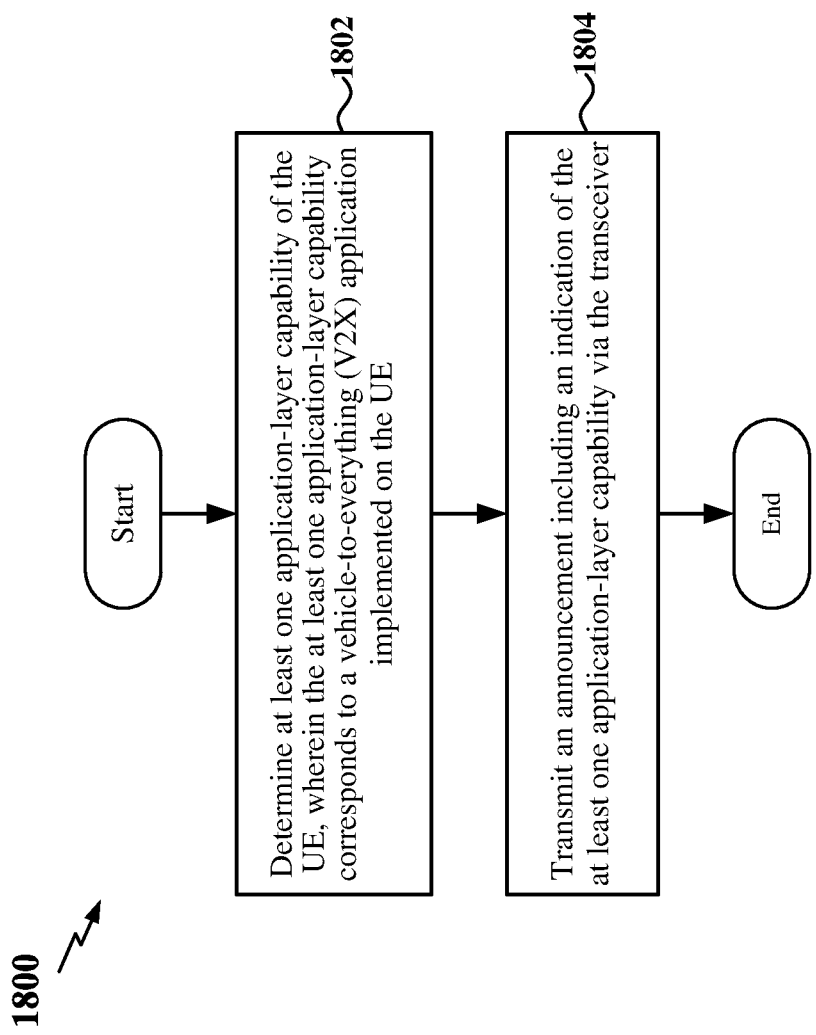
FIG. 18 is a flow chart of an exemplary process for transmitting an announcement according to some aspects.

FIG. 18 is a flow chart of an exemplary process 1800 for transmitting announcements in accordance with aspects disclosed herein. As described below, some or all illustrated features may be omitted in a particular implementation within the scope of the present disclosure, and some illustrated features may not be required for implementation of all examples. In some examples, the method may be performed by the UE 1700, as described above and illustrated in FIG. 17, by a processor or processing system, or by any suitable means for carrying out the described functions.

At block 1802, the UE may determine at least one application-layer capability of the UE, wherein the at least one application-layer capability corresponds to a V2X application implemented on the UE. For example, the application engagement circuitry 1744, shown and described above in connection with FIG. 17, may provide a means to determine at least one application-layer capability of the UE, wherein the at least one application-layer capability corresponds to a V2X application implemented on the UE. At block 1804, the UE may then transmit an announcement including an indication of the at least one application-layer capability via a transceiver. For example, the communication and processing circuitry 1742 and transceiver 1710, shown and described above in connection with FIG. 17, may provide a means to transmit an announcement including an indication of the at least one application-layer capability via a transceiver.

Figure 19:
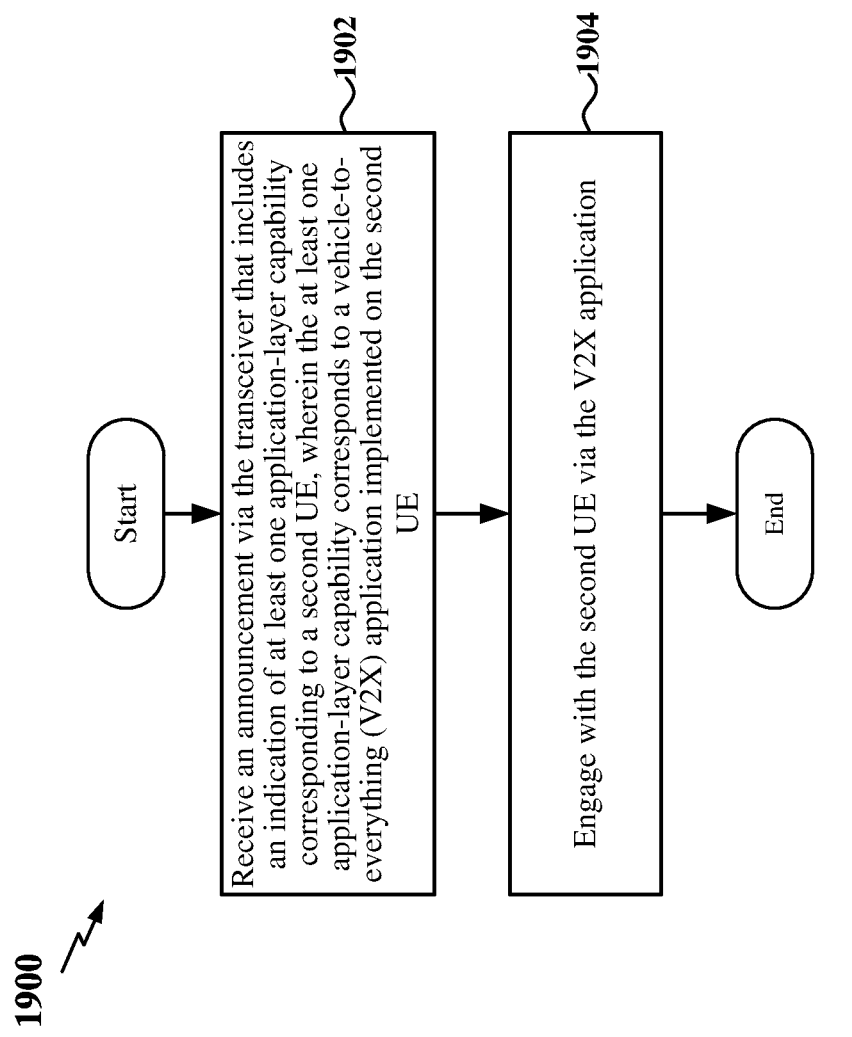
FIG. 19 is a flow chart of an exemplary process for receiving an announcement according to some aspects.

FIG. 19 is a flow chart of another exemplary process 1900 for receiving announcements in accordance with aspects disclosed herein. As described below, some or all illustrated features may be omitted in a particular implementation within the scope of the present disclosure, and some illustrated features may not be required for implementation of all examples. In some examples, the method may be performed by the UE 1700, as described above and illustrated in FIG. 17, by a processor or processing system, or by any suitable means for carrying out the described functions.

At block 1902, the UE may receive an announcement via a transceiver that includes an indication of at least one application-layer capability corresponding to a second UE, wherein the at least one application-layer capability corresponds to a vehicle-to-everything (V2X) application implemented on the second UE. For example, the communication and processing circuitry 1742 and transceiver 1710, shown and described above in connection with FIG. 17, may provide a means to receive an announcement via a transceiver that includes an indication of at least one application-layer capability corresponding to a second UE, wherein the at least one application-layer capability corresponds to a vehicle-to-everything (V2X) application implemented on the second UE. At block 1904, the UE may then engage with the second UE via the V2X application. For example, the application engagement circuitry 1744, shown and described above in connection with FIG. 17, may provide a means to engage with the second UE via the V2X application.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. 1-19 included herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) configured for wireless communication, comprising:
    one or more memories; and
    one or more processors coupled to the one or more memories, the one or more processors being configured to:
        activate at least one non-group vehicle-to-everything (V2X) application that is configured to transmit a message corresponding to the at least one non-group V2X application after an application-specific trigger is detected;
        generate, after expiration of a pre-determined period during which the application-specific trigger has not been detected, an announcement indicating that at least one application-layer capability corresponding to the activated at least one non-group vehicle-to-everything (V2X) application is actively running; and
        transmit the announcement of the at least one application-layer capability.

2. The UE of claim 1, wherein the one or more processors are further configured to receive a communication specific to the at least one non-group V2X application in response to transmitting the announcement of the at least one application-layer capability.

3. The UE of claim 1, wherein the one or more processors are further configured to transmit the message corresponding to the at least one non-group V2X application when the application-specific trigger is detected.

4. The UE of claim 3, wherein the at least one non-group V2X application is a Sensor Sharing application.

5. The UE of claim 1, wherein the one or more processors are further configured to embed the announcement including the indication of the at least one application-layer capability within one of a Basic Safety Message (BSM) or a Cooperative Awareness Message (CAM).

6. The UE of claim 1, wherein the one or more processors are further configured to generate the announcement periodically.

7. A method for wireless communication at a user equipment (UE), the method comprising:
    at least one non-group vehicle-to-everything (V2X) application that is configured to transmit a message corresponding to the at least one non-group V2X application after an application-specific trigger is detected;
    generating, after expiration of a pre-determined period during which the application-specific trigger has not been detected, an announcement indicating that at least one application-layer capability corresponding to the activated at least one non-group vehicle-to-everything (V2X) application is actively running; and
    transmitting the announcement of the at least one application-layer capability.

8. The method of claim 7, further comprising receiving a communication specific to the at least one non-group V2X application in response to transmitting the announcement of the at least one application-layer capability.

9. The method of claim 7, further comprising transmitting the message corresponding to the at least one non-group V2X application when the application-specific trigger is detected.

10. The method of claim 9, wherein the at least one non-group V2X application is a Sensor Sharing application.

11. The UE of claim 7, further comprising embedding the announcement including the indication of the at least one application-layer capability within one of a Basic Safety Message (BSM) or a Cooperative Awareness Message (CAM).

12. The UE of claim 7, further comprising generating the announcement periodically.

13. A user equipment (UE) configured for wireless communication, comprising:
    one or more memories; and
    one or more processors coupled to the one or more memories, the one or more processors being configured to:
        receive an announcement comprising an actively running indication of at least one application-layer capability corresponding to a second UE for which a pre-determined period has expired during which an application-specific trigger has not been detected, wherein the at least one application-layer capability corresponds to a non-group vehicle-to-everything (V2X) application that is configured to transmit a message corresponding to the at least one non-group V2X application after the application-specific trigger is detected and that is implemented on the second UE; and engage with the second UE via the at least one non-group V2X application.

14. The UE of claim 13, wherein the one or more processors are further configured to transmit a communication specific to the at least one non-group V2X application in response to receiving the announcement.

15. The UE of claim 13, wherein the at least one non-group V2X application is a Sensor Sharing application.

16. The UE of claim 13, wherein the one or more processors are further configured to receive the application-specific message corresponding to the at least one non-group V2X application.

17. The UE of claim 13, wherein the one or more processors are further configured to receive the announcement via one of a Basic Safety Message (BSM) or a Cooperative Awareness Message (CAM).

18. A method for wireless communication at a user equipment (UE), the method comprising:

receiving an announcement comprising an actively running indication of at least one application-layer capability corresponding to a second UE for which a pre-determined period has expired during which an application-specific trigger has not been detected, wherein the at least one application-layer capability corresponds to a non-group vehicle-to-everything (V2X) application is configured to transmit a message corresponding to the at least one non-group V2X application after the application-specific trigger is detected and that is implemented on the second UE; and engaging with the second UE via the at least one non-group V2X application.

19. The method of claim 18, further comprising transmitting a communication specific to the at least one non-group V2X application in response to receiving the announcement.

20. The method of claim 18, wherein the at least one non-group V2X application is a Sensor Sharing application.

21. The UE of claim 18, further comprising receiving the application-specific message corresponding to the at least one non-group V2X application.

22. The UE of claim 18, further comprising receiving the announcement via one of a Basic Safety Message (BSM) or a Cooperative Awareness Message (CAM).

* * * * *